United States Patent
Singh et al.

(10) Patent No.: US 10,053,113 B2
(45) Date of Patent: Aug. 21, 2018

(54) DYNAMIC OUTPUT NOTIFICATION MANAGEMENT FOR VEHICLE OCCUPANT

(71) Applicant: Jaguar Land Rover Limited, Coventry (GB)

(72) Inventors: Harpreet Singh, Coventry (GB); Duncan Robertson, Coventry (GB); Elvir Hasedzic, Coventry (GB); Carl Pickering, Coventry (GB); Lee Skrypchuk, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 15/304,962

(22) PCT Filed: Apr. 24, 2015

(86) PCT No.: PCT/EP2015/058895
§ 371 (c)(1),
(2) Date: Oct. 18, 2016

(87) PCT Pub. No.: WO2015/165811
PCT Pub. Date: Nov. 5, 2015

(65) Prior Publication Data
US 2017/0190337 A1    Jul. 6, 2017

(30) Foreign Application Priority Data

May 1, 2014    (GB) .................................. 1407711.9

(51) Int. Cl.
*B60Q 1/00*    (2006.01)
*B60W 50/14*    (2012.01)

(52) U.S. Cl.
CPC ..... *B60W 50/14* (2013.01); *B60K 2350/1044* (2013.01); *B60K 2350/1052* (2013.01); *B60W 2540/00* (2013.01); *B60W 2540/02* (2013.01)

(58) Field of Classification Search
CPC ............ G06F 3/017; B60K 2350/1096; B60K 2350/2008; B60K 2350/965; B60W 40/09; B60W 50/10; B60W 50/14
(Continued)

(56) References Cited

U.S. PATENT DOCUMENTS 8,009,025 B2 *  8/2011  Engstrom .............. G01C 21/26
                                                   340/438
9,213,522 B2 * 12/2015  Prakah-Asante ......... G06F 7/00
(Continued)

FOREIGN PATENT DOCUMENTS

DE         100 58 228 A1    5/2002
DE     10 2005 043 077 A1    3/2007
(Continued)

OTHER PUBLICATIONS

Combined Search and Examination Report, GB Application No. 1407711.9, dated Nov. 3, 2014, 8 pages.
(Continued)

*Primary Examiner* — Eric M Blount
(74) *Attorney, Agent, or Firm* — Myers Bigel, P.A.

(57) ABSTRACT

The present application relates to a communication system for controlling the output of messages to a vehicle occupant. The communication system has a processor configured to output a first message to the vehicle occupant. A signal is received from one or more sensors operative to monitor the vehicle occupant when the first message is output. The signal from said one or more sensors is analysed to determine one or more parameters relating to the response of the vehicle occupant to said first message. The communication system controls the subsequent output of at least said first message in dependence on said one or more determined parameters. The present application also relates to a method and to a vehicle.

17 Claims, 4 Drawing Sheets

(58) Field of Classification Search
USPC .................................................. 340/425.5
See application file for complete search history.

(56) References Cited

U.S. PATENT DOCUMENTS

| | | | |
|---|---|---|---|
| 9,226,115 B2* | 12/2015 | Raghunathan | H04W 4/046 |
| 9,285,944 B1* | 3/2016 | Penilla | G06F 3/04842 |
| 9,669,840 B2* | 6/2017 | Paszkowicz | B60W 40/08 |
| 2002/0091473 A1* | 7/2002 | Gardner | G07C 5/0808 |
| | | | 701/32.7 |
| 2003/0220725 A1 | 11/2003 | Harter, Jr. et al. | |
| 2007/0219672 A1* | 9/2007 | Fehr | B60W 40/08 |
| | | | 701/1 |
| 2009/0210257 A1* | 8/2009 | Chalfant | G06Q 40/08 |
| | | | 705/4 |
| 2013/0030811 A1* | 1/2013 | Olleon | B60K 35/00 |
| | | | 704/267 |
| 2013/0038437 A1* | 2/2013 | Talati | B60K 35/00 |
| | | | 340/438 |
| 2013/0157607 A1 | 6/2013 | Paek et al. | |
| 2014/0136187 A1* | 5/2014 | Wolverton | G06F 17/30654 |
| | | | 704/9 |
| 2015/0191122 A1* | 7/2015 | Roy | G08G 1/0962 |
| | | | 340/439 |
| 2015/0193598 A1* | 7/2015 | Grover | G06F 21/629 |
| | | | 726/27 |
| 2015/0199162 A1* | 7/2015 | Platz | G08G 1/0112 |
| | | | 701/1 |
| 2015/0224998 A1* | 8/2015 | Prakah-Asante | B60W 50/12 |
| | | | 701/36 |

FOREIGN PATENT DOCUMENTS

| | | |
|---|---|---|
| DE | 10 2007 029 862 A1 | 1/2009 |
| DE | 10 2012 016 820 A1 | 4/2014 |
| GB | 2500581 A | 10/2013 |
| JP | H10-288532 A | 10/1998 |
| JP | 2008-224549 A | 9/2008 |
| JP | 4697160 B2 | 6/2011 |
| WO | WO 2013/171970 A1 | 11/2013 |

OTHER PUBLICATIONS

Examination Report, GB Application No. 1407711.9, dated Jun. 28, 2016, 3 pages.
Notification of Transmittal of the International Search Report and the Written Opinion of the International Searching Authority, or the Declaration, PCT/EP2015/058895, dated Sep. 30, 2015, 14 pages.

* cited by examiner

DYNAMIC OUTPUT NOTIFICATION MANAGEMENT FOR VEHICLE OCCUPANT

RELATED APPLICATIONS

This application is a 35 U.S.C. § 371 national stage application of PCT Application No. PCT/EP2015/058895, filed on Apr. 24, 2015, which claims priority from Great Britain Patent Application No. 1407711.9 filed on May 1, 2014, the contents of which are incorporated herein by reference in their entireties. The above-referenced PCT International Application was published in the English language as International Publication No. WO 2015/165811 A1 on Nov. 5, 2015.

TECHNICAL FIELD

The present disclosure relates to a communication system and related method and particularly, but not exclusively, to a system for controlling the output of messages; to a method of controlling the output of messages; and to a vehicle.

BACKGROUND

A typical human machine interface (HMI) in a vehicle is configured to respond to interactions initiated by the user, for example the driver. When responding to the user input, the human machine interface does not consider the state of driver, for example to check whether the driver is conducting a telephone call on a cellular telephone which is not paired with the vehicle.

Embodiments of the invention provide a method or a system which addresses this issue. Other aims and advantages of the invention will become apparent from the following description, claims and drawings.

SUMMARY OF THE INVENTION

Aspects of the present invention relate to a communication system for controlling the output of messages; a method of controlling the output of messages; and a vehicle, as set out in the appended claims.

According to a further aspect of the present invention there is provided a communication system for controlling the output of messages to a vehicle occupant, the communication system comprising one or more processors configured to:

output a first message to the vehicle occupant;
receive a signal from one or more sensors operative to monitor the vehicle occupant;
analyse the signal from said one or more sensors to determine one or more parameters relating to the response of the vehicle occupant to said first message; and
controlling the subsequent output of at least said first message in dependence on said one or more determined parameters. The determined parameters can be stored, for example in memory. The message can comprise an audio output and/or a visual output. The message can communicate vehicle system information. The vehicle occupant can, for example, be a driver of the vehicle.

At least in certain embodiments, the communication system can be integrated into a vehicle to provide a dynamic system response based on occupant condition. The communication system can implement a vehicle initiated interaction or dialogue. The interaction can comprise one or more of the following: voice, gesture, touch-screen etc. The communication system can control the output of said first message based on one or more of the following: environmental factors; physiological factors; emotional factors; and situational factors.

The communication system can, for example, enable the vehicle to communicate with the vehicle occupant (or occupants) on detection of an event.

The response by the vehicle occupant to the output message can vary based on one or more of the following: the current situation (for example the occupant is eating), emotional response (for example the occupant is depressed), situational response (the occupant is talking to another occupant). These scenarios can also affect how the occupant would like the communication system to interact (for example prioritise graphic output over audio output, or vice versa).

The communication system can include voice recognition and/or gesture recognition. A self-learning mechanism can be implemented to associate different scenarios and the occupant response can modify the future response implemented by the communication system. The communication system can limit and/or change and/or adjust interaction based upon driver preferences and/or detected conditions.

The communication system can detect an emotional response from the driver, for example a raised voice or shouting, gestures showing annoyance, facial expression etc. The communication system can terminate the message and store related information. The communication system can control the subsequent output of at least said first message based on one or more of the following: surrounding situation which could affect driver (for example traffic, follow passenger etc.); and the health conditions of the vehicle occupant (measured by appropriate sensors). The communication system can be configured to learn from the occupant's responses and dismiss or inhibit similar dialogues which might otherwise prove annoying in a particular driving condition. Additionally, if the occupant frequently gives negative feedback to a certain message, the communication system can learn from such behaviour and avoid initiating a dialogue related to that message. For example, output of that message can be temporarily or permanently inhibited.

At least in certain embodiments, the communication system can detect when the driver is in a high workload state. The communication system can be configured to inhibit the output of messages when the driver workload is determined as being high. Accordingly, the communication system can avoid adding to the workload of the driver.

The communication system can also limit interaction based on detection of a particular situation, for example the driver is on the telephone, the driver is eating or talking to a fellow passenger. The communication system can, for example, automatically inhibit an audio (voice) interaction feature. The communication system can permit output of critical information. In the event that the driver requires vehicle initiated information, such as navigation support, the necessary information will be displayed on a screen. The communication system can monitor for any form of response from the driver, for example a button press, a touch screen operation, a voice (spoken) command or a gesture.

The one or more sensors can comprise an audio sensor. The one or more processors can be configured to analyse an audio signal output from said audio sensor. The audio sensor can be operative to detect a spoken response from said vehicle occupant. The one or more processors can be configured to analyse said spoken response to determine one or more characteristics. The one or more processors can measure or classify certain characteristics of the occupant's voice when responding to the first message, for example strength, volume, pitch, tone. The one or more processors can measure timing of the occupant's response to said first message.

The one or more sensors can comprise at least one image sensor. The one or more processors can be configured to analyse an image signal output from said at least one image sensor. The one or more processors can be configured to analyse said image signal to identify one or more of the following:
(a) a movement of the vehicle occupant;
(b) a gesture performed by the vehicle occupant; and
(c) a facial expression of the vehicle occupant.

The one or more processors can, for example, assess driver attentiveness or alertness based on head position and/or gaze direction.

The one or more processors can be configured to analyse the data from said one or more sensors to identify a negative response by the vehicle occupant to said first message. The negative response can be determined by analysis of the audio signal and/or the image signal.

The one or more processors can implement a counter to count the number of negative responses and to control the subsequent output of said first message based on said count.

The control of the output of said first message can comprise one or more of the following:
(a) inhibiting output of the first message for at least a first defined time period;
(b) defining an output format for the subsequent output of the first message; and
(c) adjusting the frequency with which the first message is output.

The control of the output of said first message can also include adjusting the format of the message, for example to ask a question in a different format. The different versions of the first message can be stored for access by the one or more processors. For example, a question may be posed in different ways depending on the analysis of the driver.

The one or more processors can be configured to control the output of said first message in dependence on workload of the vehicle occupant. This control strategy is particular relevant if the vehicle occupant is the driver. The driver workload can be determined by analysing the signals from said one or more sensors; and/or with reference to one or more vehicle systems. The one or more vehicle systems can represent a dynamic parameter of the vehicle, such as vehicle speed and/or steering angle. Alternatively, or in addition, the one or more vehicle systems can comprise vehicle situational data, such as local traffic information (for example, the proximity and/or number of vehicles surrounding the vehicle) and/or navigation data. The one or more processors can be configured to control the output of said first message in dependence on data received from one or more sensors arranged to detect vehicle situational data. The vehicle situational information can be derived from an on-board sensor, such as a radar system.

According to a further aspect of the present invention there is provided a vehicle comprising a communication system as described herein coupled to one or more sensors.

According to a further aspect of the present invention there is provided a method of controlling the output of messages to a vehicle occupant, the method comprising:
outputting a first message to the vehicle occupant;
using one or more sensors to monitor the vehicle occupant;
analysing a data signal from said one or more sensors to determine one or more parameters relating to a response of the vehicle occupant to said first message; and
controlling the subsequent output of at least said first message in dependence on said one or more determined parameters.

The term processor used herein refers to a microelectronic processor programmed to perform computational instructions. The computational instructions could be embedded on said one or more processors. Alternatively, the computational instructions can be provided in software which, when running on one or more processors, cause said one or more processors to implement the method described herein. A further aspect of the present invention relates to a computer-readable medium or signal containing computational instructions to perform the method described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION

A communication system 1 for a vehicle 3 in accordance with an embodiment of the present invention will now be described with reference to the accompanying figures. The communication system 1 controls communication between the vehicle and an occupant of the vehicle, typically a driver D. The communication system 1 implements a self-learning mechanism to associate different scenarios and the user responses. The resulting associations are used to modify the communication strategy implemented by the communication system 1.

Figure 1:
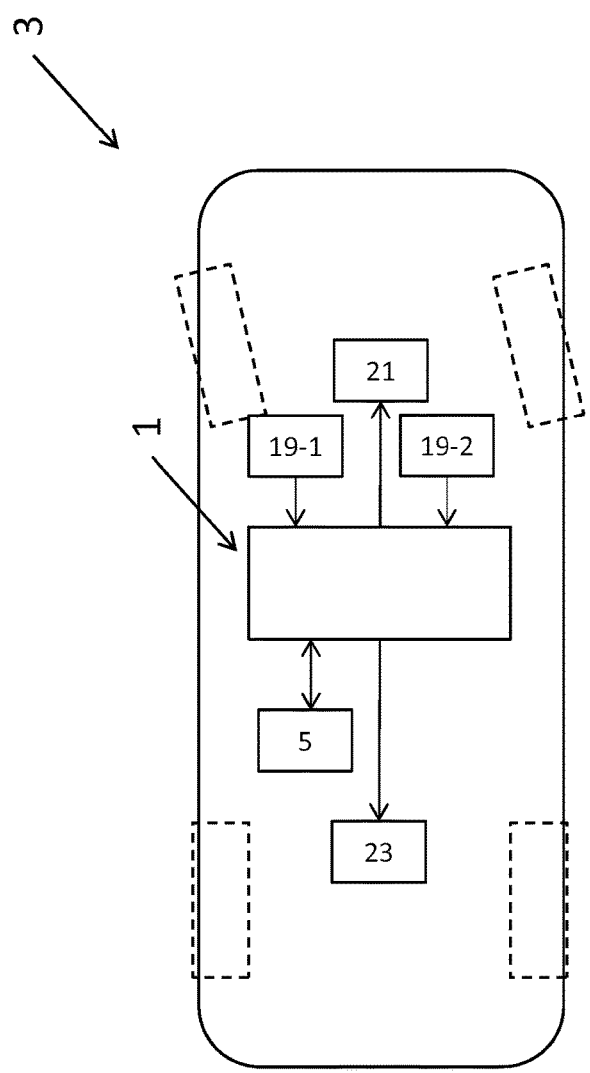
FIG. 1 shows a schematic representation of a vehicle incorporating a communication system in accordance with an embodiment of the present invention.

A schematic representation of the vehicle 3 is shown in FIG. 1. The vehicle 3 comprises an electronic control unit (ECU) 5 which communicates with vehicle systems over a communication network, such as a CAN bus (not shown).

The ECU 5 can, for example, communicate with a vehicle speedometer and/or satellite navigation system and/or infotainment system.

Figure 2:
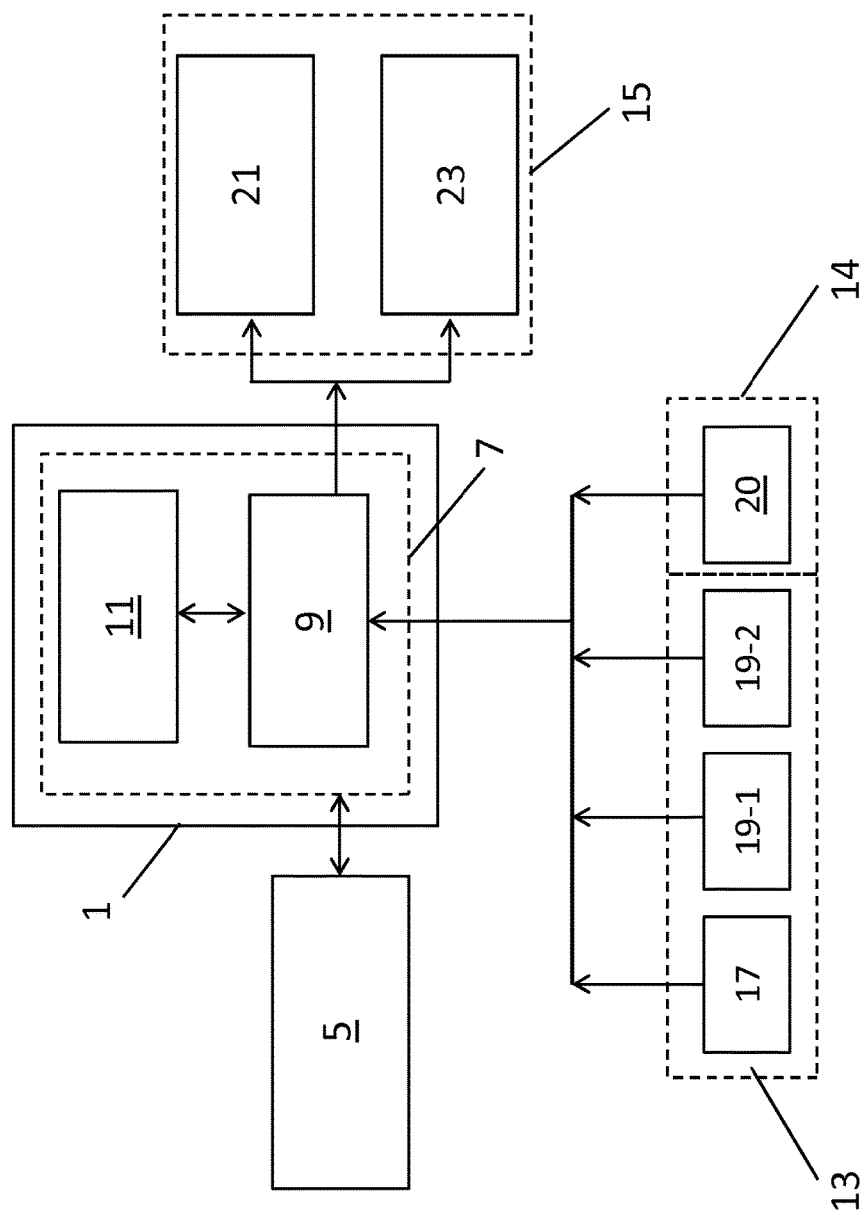
FIG. 2 is a block diagram illustrating the communication system shown in FIG. 1.

The communication system 1, shown in FIG. 2 comprises an electronic control unit (ECU) 7 having one or more processors 9 (only one of which will be described for clarity) coupled to memory 11 comprising one or more memory devices. The processor 9 is coupled to one or more or sensors 13; one or more input devices 14; and one or more output devices 15. In the present embodiment, the sensors comprise an audio sensor 17, a first image sensor 19-1 and a second image sensor 19-2. The input devices 14 comprise one or more switches 20, such as a mechanical switch or a capacitive switch. The output devices 15 include an audio speaker 21 and/or a display screen 23. The display screen 23 can optionally be a touch screen which functions as both an input and output device. As described herein, the processor 9 receives data signals from the sensors 13 and/or the input devices 14 to monitor the behaviour of the driver D. The display screen 23 can be provided in an instrument cluster or in a centre console of the vehicle 3.

The processor 9 is arranged to output an audio signal and/or an image signal to the output devices 15. The audio and image signals can be stored in said memory 11 and retrieved by said processor 9. The audio and image signals are converted to respective audio and visual outputs to communicate system information to the driver D. This information is output in blocks (or packets) and each block of information is referred to herein as a message. The messages can be in the form of an audio output and/or an image output. For example, each message each can comprise one or more of the following: a sound; one or more words (which can form a phrase, sentence or question); an image; or a series of images (for example an animated sequence of images), Haptic or Tactile Feedback. The messages can take the form of one or more of the following: an instruction, a notification, an alert, a question, and an advice. The messages can be sequenced, for example linked to form a linear series. Alternatively, the messages can be arranged in a tree structure having one or more branches. The traversal of the tree structure is performed in dependence on the driver's response to any one of the messages. The messages each form a node in the tree structure and the next message in the tree structure is selected in dependence on a user response.

The user can make inputs using said input devices 14 which may prompt the communication system 1 to output one or more additional messages. The resulting input/output interactions are referred to herein as dialogue. The user inputs can include one or more of the following: voice commands; motion gestures; activation of a predefined region of a touch-screen; detection of a gesture on the touch-screen; or manual actuation of a button or switch.

The audio sensor 17 is arranged to detect audio signals within a cabin C of the vehicle. The detected audio signals are output to the processor 9 for analysis. Speech recognition software operating on the processor 9 (or on a remote server accessed over a wireless network) analyses the resulting audio signals to identify driver commands. By way of example, the speech recognition software can differentiate between spoken commands, such as "YES/NO"; and may determine complex instructions, for example to programme an on-board satellite navigation system (not shown). The communication system 1 converts the driver commands to requests which are published to the communication network and accessed by other vehicle systems. The vehicle systems implement appropriate control strategies based on the requests obtained over the CAN bus.

Figure 3:
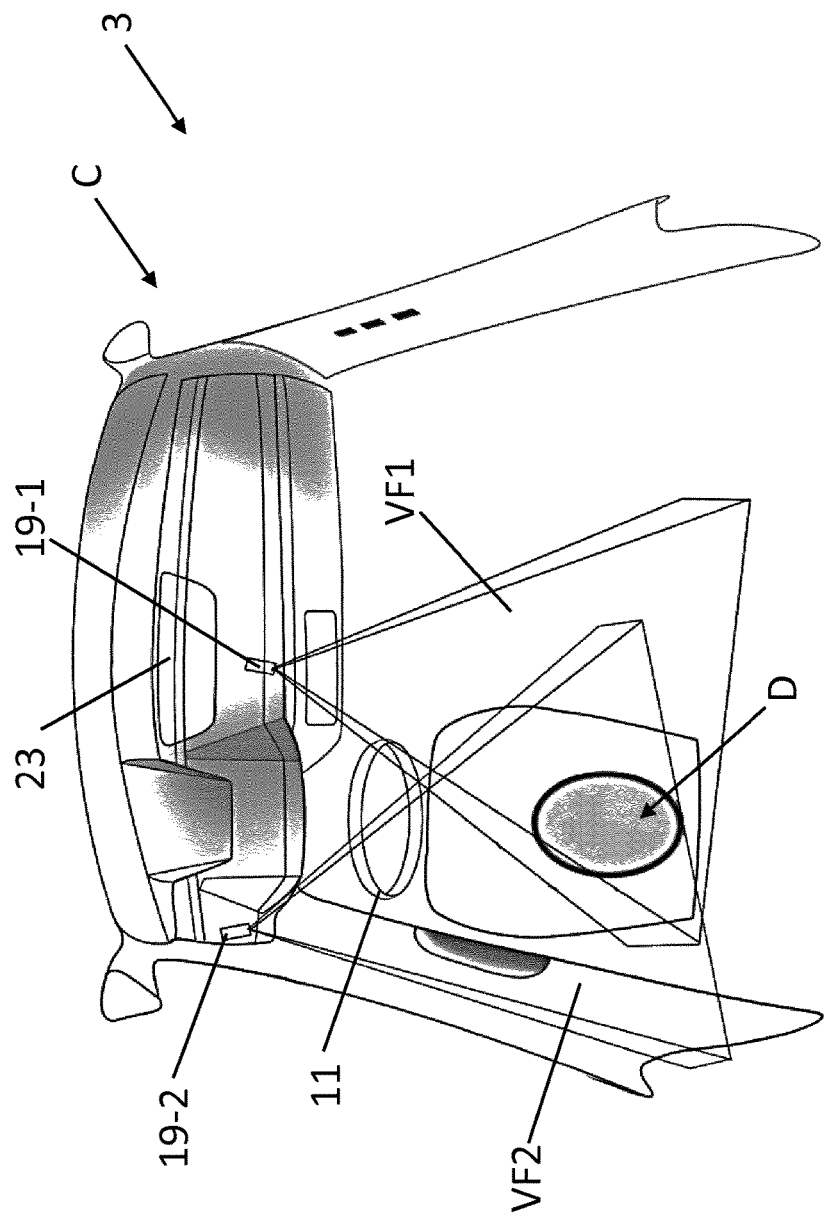
FIG. 3 is a schematic representation of an interior of the vehicle cabin.

The first and second image sensors 19-1, 19-2 are driver facing and, in use, generate image data. As shown in FIG. 3, the first image sensor 19-1 is located in a centre position within the cabin C and the second image sensor 19-2 is located on a driver side of the cabin C. The field of view matrix of each of the first and second image sensors 19-1, 19-2 is illustrated in FIG. 3 by respective view fields VF1, VF2. In operation, the first and second image sensors 19-1, 19-2 each generate image data which is output to the processor 9. The processor 9 analyses the image data to identify user movements and behaviour. The image data is analysed by image processing software running on the processor 9 to monitor driver behaviour.

The processor 9 is configured to record data based on the driver's actions. In the present embodiment, the data is generated based on the driver's responses to messages output by the communication system 1. The processor 9 quantitatively measures the driver's response to each message. For example, the processor 9 can count the number of positive or negative responses (or reactions) made by the user to a given message. The resulting data is stored in the memory 11 as historical data and is available for future access. By implementing an appropriate control algorithm, the processor 9 can use the historical data to affect the output of future messages. If the driver frequently gives a negative response to a certain message, the processor 9 learns from such behaviour and does not initiate a dialogue based on that message. For example, the processor 9 can use the historical data to calculate the probability of the driver responding positively or negatively to a given message. The processor 9 can determine when (or how frequently) to output that message in dependence on the calculated probability. The historical data can be driver-specific to provide a customised communication strategy for a given driver.

In addition to generating quantitative data, the processor 9 analyses the audio data and/or the image data to determine one or more driver parameters which are indicative of the driver state or condition. One or more driver monitoring sensors can optionally be provided to assess the condition or state of the driver, for example to monitor driver health. The processor 9 can, for example, identify one or more of the following driver parameters: personal situation of the driver (for example the driver is eating or drinking); emotional state of the driver (for example the driver is depressed, anxious or stressed); and situational state of the driver (for example the driver is talking to a passenger). The processor 9 may also determine a physical state of the driver (for example the driver is tired), or a mental state of the driver (for example the driver is distracted or inattentive). By identifying one or more driver parameters, the processor 9 can implement additional control strategies when outputting messages to the driver. The processor 9 can, for example, apply a weighting based on the driver-related parameters to determine when (or how frequently) to output a particular message in dependence on the calculated probability for that message. This weighting could also include user preferences, for example based on analysis of historic responses to one or more vehicle interfaces. Thus, the processor 9 can also control the output of future messages in dependence on an assessment of the current driver situation.

The processor 9 can analyse the audio data output from said audio sensor 17 to measure characteristics of the driver's voice, for example to measure one or more of the following: tone, pitch, strength and volume. For example, the processor 9 may determine that the driver is raising their voice or shouting when they respond to a message. The processor 9 may determine when the driver is in an annoyed or agitated state. The processor 9 can also monitor the timing of the driver's response to a message, for example does it interrupt the message or is there a long or short pause after the message has been completed. The processor 9 can derive certain driver-related parameters based on the measured characteristics. By quantifying the measured characteristics, for example based on predefined thresholds, the processor 9 can generate additional data in respect of the driver's response. This data can be written to the memory 11 and linked to the message which prompted the driver response. Equally, the analysis of the audio data may determine that the driver is stressed and this may be representative of a high driver workload. Accordingly, the processor 9 may reduce or inhibit the output of messages in dependence on one or more measured characteristics of the driver's voice. For example, the processor 9 may inhibit any non-essential or low priority messages. In this scenario, the processor 9 can implement a short-term change which is effective for a predetermined period of time.

By way of example, the processor 9 could determine that the driver is frustrated when responding to a particular message. The processor 9 would subsequently adjust the relative weighting associated with that message to reduce the frequency with which it is output to the driver. Alternatively, or in addition, the processor 9 may alter a sequence of messages based on the measured characteristics of the driver's voice. The processor 9 may select an alternate route to traverse the tree structure (or select an alternate tree structure to traverse) in dependence on the analysis of the audio data. For example, the processor 9 may select a shorter traversal of the tree structure if the analysis of the audio signal indicates that the driver is frustrated.

The processor 9 can also analyse the image data to determine one or more driver related parameters. The image processing software can analyse driver movements to monitor the current state of the driver, for example to determine fatigue levels and/or driver attentiveness. The processor 9 can also analyse the image data to identify driver gestures and/or behavioural patterns of the driver.

If a high driver workload is detected by the processor 9, the communication system 1 can automatically inhibit the initiation of a dialogue to avoid adding to the driver workload. An estimate of the driver workload can be derived from the analysis of the audio data and/or the image data and/or vehicle system data. The data published to the CAN bus from other vehicle systems, such as on-board cameras and/or radar systems, can also be used to determine driver workload. The dynamic operating characteristics of the vehicle, such as vehicle speed and/or steering angle, could also be used to assess driver workload.

The communication system 1 implements a self-learning mechanism to associate different scenarios (identified through the analysis of said audio data and/or said image data) with the corresponding user responses. The communication system 1 modifies future communication strategies based on the determined associations. By way of example, the communication system 1 can inhibit the output of certain messages and increase the frequency with which other messages are output. Moreover, the processor 9 can limit or change the method of interaction (for example prioritising an audio output over a visual output, or vice versa) based upon driver preferences and conditions.

The processor 9 can also be configured to analyse surrounding information which may affect the driver, such as traffic and fellow passengers. The processor 9 can optionally also be configured to monitor the driver condition, for example one or more aspects of the driver's health. The driver health can be monitored through biometric sensors, such as a heart rate monitor, a temperature sensor and so on. The vehicle environment can be monitored through traffic data from internet, vehicle camera image recognition along with ultrasonic and radar sensor. The vehicle environment can also include road conditions which can be analysed through camera image processing and/or vehicle suspension data and/or online data. This additional information can also be used to affect the output of future messages. The processor 9 learns from the driver's responses and inhibits the output of that message (or similar messages) when the same or similar driving conditions are detected.

The communication system 1 can also limit interaction when a personal situation is detected, for example the driver is on the phone, eating or talking to a fellow passenger. The processor 9 can, for example, automatically limit the output of audio signals when one or more these situations is detected. This function can be overridden to present critical information which could be create dangerous situation for the vehicle 3 or surrounding vehicles. In the event that the driver still requires information to be output, for example to provide navigation support, the processor 9 will output image data for display on the screen. The processor 9 will continue to receive any form of response back from driver, for example touch screen, voice or gesture.

The operation of the communication system 1 to control the output of future messages will now be described with reference to a flow chart 100 shown in FIG. 4. The user replies negatively to a certain message repeatedly for more than a threshold value. If the user responds negatively to a given question over a threshold time, the processor 9 takes the first system out temporarily and bring question back into loop after a period of time to check if the user preference has changed. A permanent loop is implemented with a permanent loop counter (P) and a permanent out of loop threshold value (Z). The temporary loop is implemented with a temporary loop counter (N) and a loop counter threshold value (X). An out of loop time (T) is implemented along with a temporary-to-permanent threshold (Y). The out of loop time (T) defines how long a question is taken out of loop (i.e. the time period during which output of the question is inhibited). The loop counter threshold value (X) operates to take a question out of the loop for the defined out of loop time (T) or for a fixed number of times, as defined by the temporary-to-permanent threshold (Y). The temporary-to-permanent threshold (Y) defines how many times a question will be skipped before asking the user again if they need this question node. The communication system 1 will take the question out of the loop if one or both of the following conditions is satisfied: (a) the user gives a negative response to the question for more than the defined out of loop time threshold (T); and (b) the user skips the question a number of times greater than the temporary-to-permanent threshold (Y) before the temporary disable period (X) times out. If the period of time for which the question is temporarily disabled goes above the temporary disable period (X), the communication system 1 will test whether the user requires this information. This approach can help to avoid the situation whereby a question is asked repeatedly. If the user responds again negatively, the temporary counter (N) is increased and the question node is temporarily disabled. The communication system 1 increases the permanent loop counter (P) when the user responds negatively a fixed number of times within the temporary loop. This approach is intended to avoid permanently taking a question out of loop prematurely and also to avoid asking the same question repeatedly which may result in increased user annoyance or frustration. To avoid these situations, a temporary disable counter and/or a permanent disable counter can be implemented. A temporary disable threshold and a permanent disable threshold can be defined for the respective temporary disable counter and the permanent disable counter. The system can inhibit output of a question (or remove that question from circulation) if the user responds negatively for more than the product of the permanent counter threshold and the threshold counter threshold. For example, if the temporary counter threshold is defined as seven (7) and the permanent counter threshold is defined as five (5), the communication system 1 can be configured to ask a question thirty-five (35) times before deleting that question permanently.

A user, typically the driver, responds to a message output by the processor 9 (STEP 101). The message can, for example, be a question intended to prompt a response from the user to provide information or instructions. The processor 9 records the response and performs analysis against external conditions (STEP 103). A check is performed to determine if the user has responded negatively to that message more times than a predefined negative threshold under driving conditions above a driving condition threshold (STEP 105). An external condition threshold can be defined which is the aggregate of driver state conditions and driving conditions. These conditions include one or more of the following:

Driver conditions
   a. Driver Work load and health (fatigue, boredom etc.)
   b. Driver Mood/emotion
   c. Driver's concentration on road
Driving Conditions
   a. Traffic
   b. Weather condition and temperature
   c. Road Type and condition (e.g. Motorway, A-road or Country side road; Conditions: bumpy road, smooth road)
   d. Vehicle conditions
   e. Passenger presence
   f. Time of the day (Day or Night etc.)
   g. Driver's schedule (through calendar)
   h. Destination and journey type (familiar destination, unfamiliar destination, daily commute)
   i. Hazards
   j. Surroundings (e.g. how scenic the road is; Speed limits etc.)
   k. Distance to travel Each time the user responds to a query, the communication system 1 records the input and driving conditions (for example in a table). If the user gives a negative response to the question, the communication system 1 performs a check to determine how many times the user has responded negatively in closely matching external conditions. It is envisaged that it will be rare to match all of the driving conditions and driver condition, so the communication system 1 can implement a threshold percentile value to detect closely matching conditions, for example how many times the user said "No" when a similarity of 80% or above was identified for the determined driver condition and/or driving conditions. The driver condition and/or the driving conditions can provide another variable to enable a situation-aware decision to be made. The communication system 1 will not disable a question node if the determined conditions are not above a defined matching threshold. An alternative to applying a percentile value would be to implement a weighting system to prioritise conditions and, in dependence on the determined priorities, to detect if the condition matching value goes above a threshold to make an informed decision. If the check is negative (i.e. the user has not responded negatively more times than the negative threshold), the processor 9 records the user response for future decision making (STEP 107). If the check is positive (i.e. the user has responded negatively more times than the negative threshold), the processor 9 temporarily removes that message from a permanent loop (STEP 109).

The processor 9 may arrive at the same message or message chain again in the future (STEP 111). A check is performed to determine if the time period since the message was temporarily disabled is greater than a predefined message disabled threshold (STEP 113), i.e. T>X days or N>Y times. If the time period is greater than the message disabled threshold, the processor 9 outputs the message to the user (STEP 115). If the time period is less than the message disabled threshold, the processor 9 enters a temporary loop (N) and a further check is performed to determine if the number of times that the message has skipped out of the temporary loop (N) is above a predefined temporary loop threshold (STEP 117). If the message has skipped out of the temporary loop (N) more times that the temporary loop threshold, the processor 9 outputs the message to the user (STEP 115).

If the message has skipped out of the temporary loop less times than the temporary loop threshold, a check is performed to determine whether a driving condition match temporarily disabled function is above a driving condition threshold (STEP 119).

If the driving condition function is below the temporary loop threshold, the frequency with which the message is output is reduced and/or the threshold for matching driving conditions is increased (STEP 121). Thus, in dependence on a decrease in the external conditions, the frequency with which a question is output to the user will be reduced. The message is then brought back into the loop for the determined driving condition (STEP 123), optionally with a reduced frequency. If the message has skipped out of the temporary loop more times than the temporary loop threshold, a check is performed to determine whether the user has previously raised any query regarding temporarily disabling the message (STEP 125). If the user has not made such a request, the temporary loop counter (N) is incremented by one (N=N+1) and the processor 9 returns to the earlier check (STEP 127) to determine if the time since the message was temporarily disabled is greater than the threshold period (STEP 113). If the user has made such a request, the frequency with which the message is displayed is reduced and/or the threshold for matching driving conditions is increased (STEP 121). Also, if user raise a query about the question/node temporarily disabled; system will records threshold value for that question at step 121 at the moment of time and user current external conditions. Next time when user comes to this question/node, system uses these two criteria's before presenting questions to the user. This will ensure the question is asked only in closely matched conditions and in other conditions system will use the temp counter method to identify if user is interested in this information. The flow from step 119 to 121 is additional functionality and could be optional.

Once the message is output, a check is performed to determine the user response (STEP 129). If the response is negative, the message is brought back into the loop for the current driving condition (STEP 123). If the response is positive (STEP 131), a permanent loop counter (P) is incremented by one (P=P+1). A check is then performed to determine if the permanent loop counter (P) is greater than a permanent out-of-loop threshold value (Z) (STEP 133). If the permanent loop counter (P) is greater than the permanent out-of-loop threshold value (Z) (i.e. P>Z), the message is removed from the permanent loop until the user requests that message again (STEP 135). If the permanent loop counter is smaller than the permanent out-of-loop threshold value (Z) (i.e. P<Z), the temporary loop counter is reset along with the threshold period (STEP 137) and the message is temporarily removed from the permanent loop (STEP 109).

Figures 4, 5, 6:
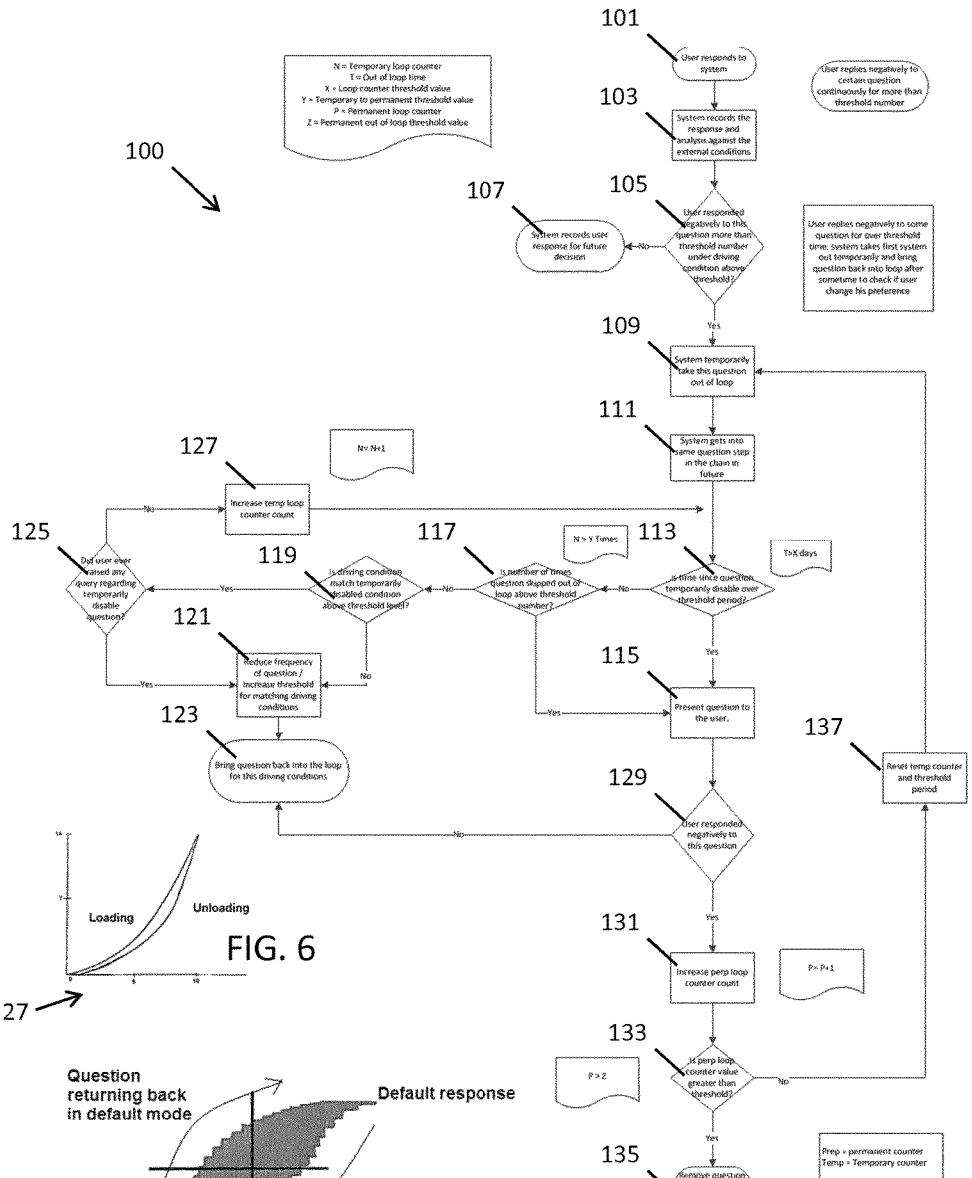
FIG. 4 is a flow chart illustrating the operation of the communication system shown in FIG. 1.
FIG. 5 shows a first graph showing the behaviour of the communication system according to an aspect of the present invention.
FIG. 6 shows a second graph illustrating the loading and unloading cycle.

A first graph 25 showing the behaviour of the communication system 1 is illustrated in FIG. 5. The graph illustrates the cycle of increasing frequency with which the message is output based on the default system settings and the reduction in frequency resulting from taking the message out of loop based on the user response. This results in a loading and unloading cycle, as illustrated in a second graph 27 shown in FIG. 6, which responds to the driver response over time.

A weighting can be applied to implement a time degradation function. The weighting applied to historical data is thereby reduced over time.

It will be appreciated that various changes and modifications can be made to the present invention without departing from the scope of protection conferred.

1. A communication system for controlling the output of messages to a vehicle occupant, the communication system comprising one or more processors configured to:
   output a first message to the vehicle occupant;
   receive a signal from one or more sensors operative to monitor the vehicle occupant;
   analyse the signal from said one or more sensors to determine one or more parameters relating to the response of the vehicle occupant to said first message; and
   controlling the subsequent output of at least said first message in dependence on said one or more determined parameters.
2. A communication system as described in paragraph 1, wherein said one or more sensors comprise an audio sensor and said one or more processors are configured to analyse an audio signal output from said audio sensor.
3. A communication system as described in paragraph 2, wherein the audio sensor is operative to detect a spoken response from said vehicle occupant and said one or more processors are configured to analyse said spoken response to determine one or more characteristics.
4. A communication system as described in paragraph 1, wherein said one or more sensors comprise at least one image sensor and said processor is configured to analyse an image signal output from said at least one image sensor.
5. A communication system as described in paragraph 4, wherein said one or more processors are configured to analyse said image signal to identify one or more of the following:
   (a) a movement of the vehicle occupant;
   (b) a gesture performed by the vehicle occupant; and
   (c) a facial expression of the vehicle occupant. Assess driver attentiveness.
   (d) a facial expression of the vehicle occupant to assess emotional status of occupant.
6. A communication system as described in paragraph 1, wherein said one or more processors is configured to analyse the data from said one or more sensors to identify a negative response by the vehicle occupant to said first message.
7. A communication system as described in paragraph 6, wherein said one or more processors implement a counter to count the number of negative responses and to control the subsequent output of said first message based on said count.
8. A communication system as described in paragraph 1, wherein controlling the output of said first message comprises one or more of the following:
   (a) inhibiting output of the first message for at least a first defined time period;
   (b) defining an output format for the subsequent output of the first message; and
   (c) adjusting the frequency with which the first message is output.
9. A communication system as described in paragraph 1, wherein said one or more processors is configured to control the output of said first message in dependence on workload of the vehicle occupant.
10. A communication system as described in paragraph 1, wherein said one or more processors is configured to control the output of said first message in dependence on data received from one or more sensors arranged to detect vehicle situational data.
11. A vehicle comprising a communication system as described in paragraph 1 coupled to one or more sensors.
12. A method of controlling the output of messages to a vehicle occupant, the method comprising:
    outputting a first message to the vehicle occupant;
    using one or more sensors to monitor the vehicle occupant;
    analysing a data signal from said one or more sensors to determine one or more parameters relating to a response of the vehicle occupant to said first message; and
    controlling the subsequent output of at least said first message in dependence on said one or more determined parameters.

The invention claimed is:

1. A communication system for controlling the output of messages to a vehicle occupant, the communication system comprising one or more processors configured to:
   output a first message to the vehicle occupant;
   receive a signal from one or more sensors that monitor the vehicle occupant;
   analyse the signal from the one or more sensors to determine one or more parameters relating to a response of the vehicle occupant to the first message, wherein the one or more parameters provide identification of a negative response by the vehicle occupant to the first message;
   implement a counter to count negative responses;
   implement a second counter; and
   control subsequent output of the first message in dependence on the counter and the second counter.
2. The communication system of claim 1, wherein the one or more parameters provide identification of a positive response by the vehicle occupant to the first message and the counter counts positive responses.
3. The communication system of claim 2, wherein the one or more processors is configured to calculate a probability of a driver responding positively or negatively to the first message.
4. The communication system of claim 1, wherein the one or more sensors comprise an audio sensor and the one or more processors are configured to analyse an audio signal output from the audio sensor.
5. The communication system of claim 4, wherein the audio sensor is operative to detect a spoken response from the vehicle occupant and the one or more processors are configured to analyse the spoken response to determine one or more characteristics.

6. The communication system of claim 1, wherein the one or more sensors comprise at least one image sensor, and wherein the one or more processors are configured to analyse an image signal output from the at least one image sensor.

7. The communication system of claim 6, wherein the one or more processors are configured to analyse the image signal to identify one or more of the following:
 (a) a movement of the vehicle occupant;
 (b) a gesture performed by the vehicle occupant;
 (c) a facial expression of the vehicle occupant to assess attentiveness of the occupant; and
 (d) a facial expression of the vehicle occupant to assess emotional status of the occupant.

8. The communication system of claim 1, wherein the one or more processors are configured to control the output of the first message by:
 (a) inhibiting output of the first message for at least a first defined time period;
 (b) defining an output format for the subsequent output of the first message; and
 (c) adjusting a frequency with which the first message is output.

9. The communication system of claim 1, wherein the one or more processors are configured to control the output of the first message in dependence on workload of the vehicle occupant.

10. The communication system of claim 1, wherein the one or more processors are configured to control the output of the first message in dependence on data received from one or more sensors arranged to detect vehicle situational data.

11. A vehicle, comprising:
 one or more sensors; and
 a communication system coupled to the one or more sensors that controls output of messages to a vehicle occupant, the communication system comprising one or more processors configured to:
  output a first message to the vehicle occupant;
  receive a signal from one or more sensors that monitor the vehicle occupant;
  analyse the signal from the one or more sensors to determine one or more parameters relating to a response of the vehicle occupant to the first message, wherein the one or more parameters provide identification of a negative response by the vehicle occupant to the first message;
  implement a counter to count negative responses;
  implement a second counter; and
  control subsequent output of the first message in dependence on the counter and the second counter.

12. A method of controlling the output of messages to a vehicle occupant, the method comprising:
 outputting a first message to the vehicle occupant;
 using one or more sensors to monitor the vehicle occupant;
 analysing a data signal from the one or more sensors to determine one or more parameters relating to a response of the vehicle occupant to the first message, wherein the one or more parameters provide identification of a negative response by the vehicle occupant to the first message;
 electronically counting negative responses;
 electronically implementing a second counter; and
 controlling the subsequent output of at least the first message in dependence on the count of negative responses and the second counter.

13. The method of claim 12, wherein the one or more parameters provide identification of a positive response by the vehicle occupant to the first message, and wherein the method further comprises counting positive responses.

14. The method of claim 13, wherein the one or more processors are configured to calculate a probability of a driver responding positively or negatively to the first message.

15. The method of claim 14, wherein the one or more processors are configured to determine when to output the first message in dependence on the calculated probability.

16. The communication system of claim 3, wherein the one or more processors are configured to determine when to output the first message in dependence on the calculated probability.

17. The communication system of claim 1, wherein controlling subsequent output comprises changing a method of interaction.

* * * * *